(12) United States Patent
Colletti et al.

(10) Patent No.: US 10,114,622 B2
(45) Date of Patent: Oct. 30, 2018

(54) METHOD AND SYSTEM FOR CUSTOMIZING A GRAPHIC USER INTERFACE OF A MANUFACTURING EXECUTION SYSTEM SCREEN

(71) Applicant: SIEMENS AKTIENGESELLSCHAFT, Munich (DE)

(72) Inventors: Paola Colletti, Genoa (IT); Stefano Noferi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 170 days.

(21) Appl. No.: 13/724,762

(22) Filed: Dec. 21, 2012

(65) Prior Publication Data

US 2013/0167046 A1   Jun. 27, 2013

(30) Foreign Application Priority Data

Dec. 22, 2011  (EP) .................................. 11195297

(51) Int. Cl.
  *G06F 8/38*   (2018.01)
  *G06F 3/0484*  (2013.01)
  *G06F 8/20*   (2018.01)
  *G06F 8/34*   (2018.01)

(52) U.S. Cl.
  CPC .............. *G06F 8/38* (2013.01); *G06F 3/0484* (2013.01); *G06F 8/20* (2013.01); *G06F 8/34* (2013.01)

(58) Field of Classification Search
  CPC ......... G06F 17/30884; G06F 17/30873; G06F 8/20; G06F 8/38; G06F 8/34; G06F 3/0484; G05B 2219/23258; G06B 2219/23258

USPC ................... 715/760, 762–763, 779; 700/96; 702/182, 188

See application file for complete search history.

(56) References Cited

U.S. PATENT DOCUMENTS

| | | | |
|---|---|---|---|
| 6,819,343 B1 * | 11/2004 | Sobeski et al. ............... | 715/848 |
| 6,909,996 B2 * | 6/2005  | Huang et al. ................. | 702/188 |
| 7,562,305 B2 * | 7/2009  | Need et al. .................... | 715/744 |
| 7,614,004 B2 * | 11/2009 | Milic-Frayling et al. ..... | 715/762 |
| 7,617,486 B2 * | 11/2009 | Sharma et al. ............... | 717/125 |
| 8,060,222 B2 * | 11/2011 | Eldridge et al. .............. | 700/83  |
| 8,275,863 B2 * | 9/2012  | Selgas et al. ................. | 709/221 |
| 8,341,608 B2 * | 12/2012 | Cepero Gonzalez ......... | 717/140 |

(Continued)

*Primary Examiner* — Andrew L Tank
(74) *Attorney, Agent, or Firm* — Laurence Greenberg; Werner Stemer; Ralph Locher

(57) ABSTRACT

A method customizes a user-interface of a page-screen of a software application taking into account a customer requirement. The method includes providing, for a page-screen, a toolbar being a configurable graphic control, i.e. a configurable toolbar. The configurable toolbar contains a set of customizable buttons. Provided within the set of customizable buttons, is the possibility to add a forward smart navigation button which, if clicked, directs one to an additional page screen, from a source page to a target page. A graphic configuration tool enables the configuration of the configurable toolbar. The source page is explored so that the configurable toolbar is presented with the set of customizable buttons. A forward smart navigation button to direct to a selected target page is added. At engineering time, one associates to the smart navigation button, a URL address of the selected target page per the customer requirement.

8 Claims, 1 Drawing Sheet

(56) References Cited

U.S. PATENT DOCUMENTS

| | | |
|---|---|---|
| 2002/0154159 A1 | 10/2002 | Day et al. |
| 2003/0195646 A1* | 10/2003 | Yang et al. .................... 700/96 |
| 2004/0187090 A1* | 9/2004 | Meacham .................... 717/103 |
| 2005/0262481 A1 | 11/2005 | Coulson |
| 2008/0184157 A1* | 7/2008 | Selig ............................ 715/781 |
| 2008/0201634 A1* | 8/2008 | Gibb et al. .................... 715/256 |
| 2009/0217146 A1 | 8/2009 | Goldfarb |
| 2009/0217180 A1* | 8/2009 | Tovino et al. ................ 715/762 |
| 2010/0199194 A1* | 8/2010 | Kumar et al. ................. 715/760 |
| 2010/0205618 A1 | 8/2010 | Gonzalez et al. |

\* cited by examiner

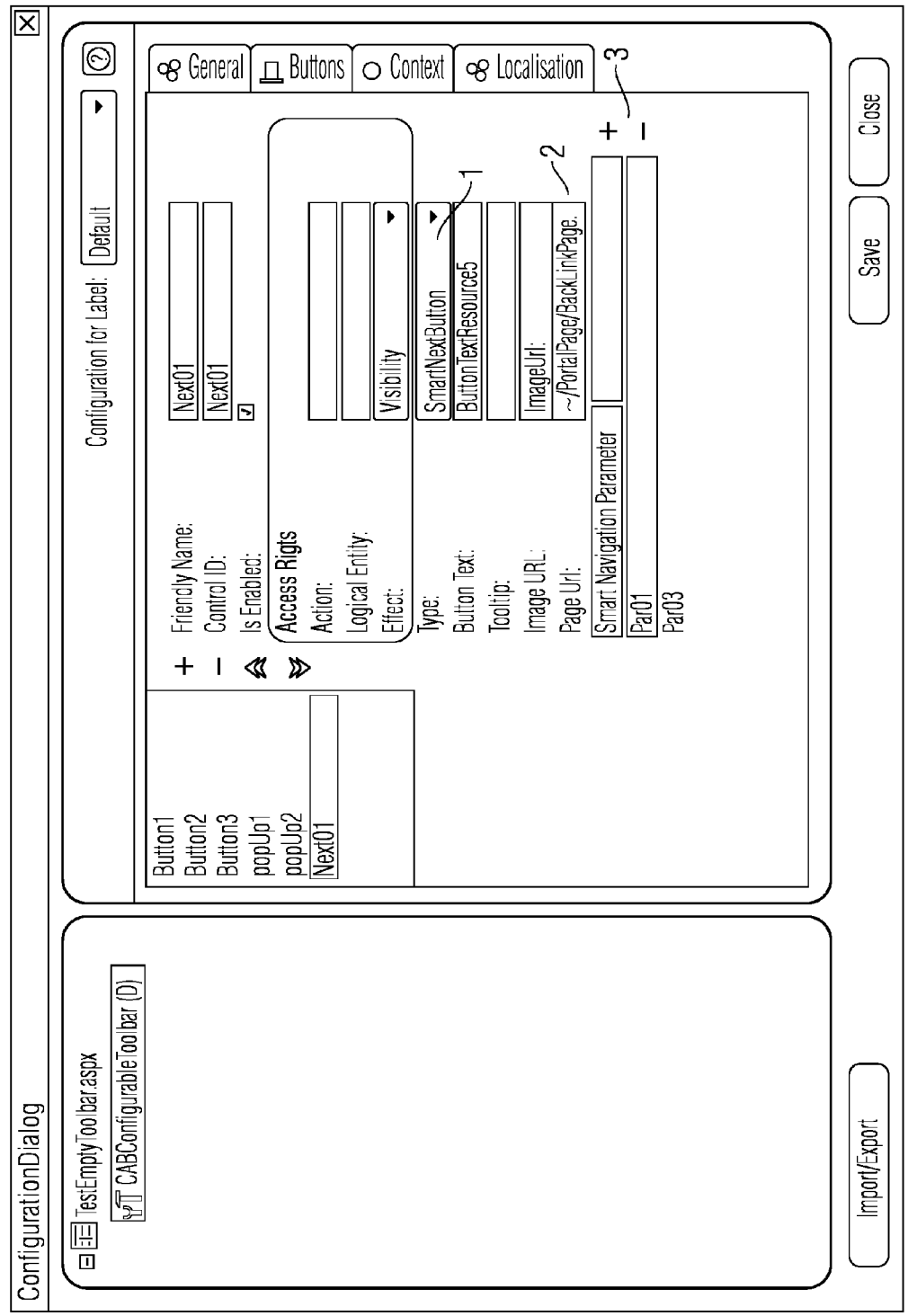

METHOD AND SYSTEM FOR CUSTOMIZING A GRAPHIC USER INTERFACE OF A MANUFACTURING EXECUTION SYSTEM SCREEN

CROSS-REFERENCE TO RELATED APPLICATION

This application claims the priority, under 35 U.S.C. § 119, of European application EP 11 195 297.4, filed Dec. 22, 2011; the prior application is herewith incorporated by reference in its entirety.

BACKGROUND OF THE INVENTION

Field of the Invention

The present invention relates to a method and to a system for customizing a graphical user interface (GUI) of a manufacturing execution system (MES) screen.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated information technology (IT) infrastructure that helps them in coordinating production on a global scale and, if necessary, in real time. The manufacturing execution system (MES) is generally known as the IT layer that integrates the business systems (e.g. ERP) and production control systems.

Siemens Corporation offers a broad range of MES products, under its SIMATIC® product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred as ISA-95 or S95.

The functions that a MES system usually includes are resource allocation and status, dispatching production orders, data collection/acquisition, quality management, maintenance management, performance analysis, operations/detail scheduling, document control, labor management, process management and product tracking.

Thus, the goal of MES systems developed by software suppliers is to provide manufacturing companies (the customers) with tools for measuring and controlling production activities with the aim of boosting profitability, increasing productivity, improving quality and process performance to manufacturing plants.

As used herein, a software application is a set of software components developed by software developers, at development time, to perform some useful actions within a MES system, e.g. monitoring values coming from plant process or controlling a plant device.

Typically, at engineering or configuration time, system engineers flexibly customize MES applications according to the specific manufacturing plant requirements.

Instead, at runtime, MES applications are utilized by end-users who may be plant operators or line responsible personnel.

MES systems are provided with front-end/client GUI applications which may be used by end-users to plan and control manufacturing activities.

MES GUI applications play a key role in bringing together process, quality and business information from various sources into one unified real-time view of the production status of the plant. In fact, MES GUI applications display to the end-user graphical screens which enable overview several parameters or scenarios of the plant activities.

Nowadays MES screens are mostly developed in the form of web-pages.

For example, with MES application suite SIMATIC IT, it is provided a client application builder which is composed of a set of modules allowing users to build customized GUI screen-pages.

Typically, software suppliers develop a MES software-product as a general purpose solution to meet several and different customer requirements. As a consequence to it, also the collections of MES screens, which are supplied with the MES product, are configured, at page developing time, to be general purpose in order to be used in various different situations.

However, since customers require that MES products be customized for a specific project fitting their specific needs, also the GUIs of MES screens need to be customized in order to satisfy the customer requirements of the specific project. This customer need is a fundamental one since the end-users, at the customer site, interact with the MES product mainly through the GUI of the MES-screens.

Hence, some enhancement needs of MES customers have to be fulfilled on the specific single project, so that the effectiveness and the usability of the MES solution are improved.

An enhancement need of MES customers in order to improve the effectiveness and the usability of the solution specific for a single project, regards the navigation schema, i.e. the links between the graphic screens that have to be connected to each other.

Unfortunately, in order to implement this enhancement, the system engineer, in charge to adapt the general purpose solution according to the customer needs, has to evaluate each single generic screen and to find a way to connect them in order to build up the application according to the customer requirements. The connection between generic screens always requires modifying the screen itself and this can become a problem when the system engineer wants to keep the screen in a generic form.

Hence it is seen that, since different MES customers have different requirements, different types of customizations are needed.

In the prior art, the customization problem of MES screen has been solved in two ways. According to a first way, the source codes of the screens are delivered to the system engineers or to the system integrators who modify them according to the required customizations. This action has relevant cost impacts in terms of required time and efforts. In addition, another drawback is that the proprietary source code is exposed to third parties who often are not employees of the software developing company resulting in possible intellectual property problems.

According to a second way, the screens are developed from scratch by the software developers in order to meet the customer needs. A brand new web-page, in replace of the original one, is to be created containing the required customizations. Unfortunately the second way has the drawback that it is not possible to develop general-purpose screens but only project-specific ones. The customization is customer-specific: a new modified version of the page is created. This action has a very high effort: effort of time for the analysis of the original page (the person who customize the screen is not usually the same who created it); effort of time to modify the page; effort of time to test the page (also some solid regression test is needed); effort to maintain a different version of the same page for different customers.

Unfortunately, in both known ways of customizing MES web-screens, the source code of the web-page has to be modified. This fact implies that the source code of the product-delivered screens needs to be completely tested again, with the relevant cost impacts in terms of time and efforts, also taking into account requirements on code maintenance and upgrades.

Moreover, with known methods of customizing MES web-screens, not only the development and customization efforts are increased but also the reusability of the delivered web-screens is reduced.

SUMMARY OF THE INVENTION

It is therefore the aim of the present invention to overcome the above mentioned drawbacks, in particular by providing a method and a system for customizing a GUI of a MES screen without modifying the source code of the web-screen.

The aforementioned aim is achieved by a method and a system for customizing a user-interface of a screen of a general purpose MES software application taking into account a specific customer requirement, the screen being a web-page, hereinafter called page-screen. The invention includes:

providing, for at least one page-screen, a toolbar which is a configurable graphic control, herein after referred as configurable toolbar, wherein the configurable toolbar contains a set of customizable buttons;

providing, within the set of customizable buttons, the possibility to add at least one forward smart navigation button which, if clicked at run-time, is directing to an additional page screen, the calling page screen and the called additional page screen are hereinafter referred as source page and target page respectively;

providing a graphic configuration tool for enabling the configuration of the configurable toolbar;

at engineering time, through the configuration tool, exploring the source page so that the configurable toolbar is presented with the set of customizable buttons;

at engineering time, through the configuration tool, adding, to the set of customizable buttons, at least one forward smart navigation button in order to direct to a given selected target page; and at engineering time, through the configuration tool, associating to the added at least one smart navigation button the URL address of the given selected target page according to a given customer requirement.

According to an embodiment of the invention, in the set of customizable buttons it may preferably be provided the possibility to add a backward smart navigation button which, if clicked at run-time, is directing from the target page back to the calling source page.

In another embodiment of the invention, the method may conveniently further include providing a navigation context for storing a set of parameters to be exchanged between the source page and the target page.

Preferably, the set of parameters may contain a set of data parameters and/or a set of status parameters.

In a further embodiment of the invention, the method may further advantageously contain the sub-item of selecting a subset of data parameters to be supplied to the target page, at run-time, through the navigation context.

Invention embodiments may further conveniently contain, at engineering time, the item of defining a desired view in which the target page is loaded at run-time depending on the values of the selected subset of data parameters.

In invention embodiments, at run time, when clicking the backward smart navigation button from the target page, the called source page may preferably be loaded in a view depending on the values of the set of status parameters stored in the navigation context when the forward button was clicked in the source page at run-time.

Hence, it is advantageously enabled the switching, at run time, between a source page and a target page of a user-interface of a screen of a general purpose MES software application customized according to the invention or according to any of its embodiments.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method. In addition, a computer, a processor or a computing device can be programmed to perform the method steps.

Embodiments of the invention advantageously enable customizations by changing the page configuration through a dedicated tool so that the source code is not modified.

Embodiments of the invention conveniently lead to cost reductions, for the now described reasons. Required efforts for customizing the web screens are reduced. Required maintenance of the software product is reduced. The approach is less error prone. There is no need for an exhaustive analysis and for knowledge of the original page design. No regression test is needed for the web-page.

The customizations implemented through the proposed invention are not coded on the page so that in case of error they can be removed without affecting the original functionality of the original page supplied by the product.

With invention embodiments, the intellectual property of the original page is preserved.

Embodiments of the invention allow linking to each other two or more screens supplied with a MES product with a reduced effort.

Embodiments of the invention allow interconnecting generic independent screens.

Embodiments of the invention allow building in an easy manner a customized navigation schema for each MES application improving the usability of the application without give up to use generic screens.

Embodiments of the invention allow system engineers to create a link between two screens without accessing the page source code with the use of a graphic tool.

Other features which are considered as characteristic for the invention are set forth in the appended claims.

Although the invention is illustrated and described herein as embodied in a method and system for customizing a graphic user interface of a manufacturing execution system screen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a snapshot example taken from a configurable toolbar of a page screen GUI according to an example embodiment of the present invention.

DETAILED DESCRIPTION OF THE INVENTION

According to the present invention, a user-interface of a screen of a general purpose MES software application is customized taking into account a specific customer requirement. The screen is a web-page, herein called a page-screen.

Within the SIMATIC MES application suite, the MES page screens are built via the client application builder which is a web-based, graphical user interface for building cross-functionality graphic screens. The client application builder of SIMATIC IT is based on Microsoft ASP.NET technology, so when the page is rendered on the client, it is composed by HTML and script.

For at least a page-screen, a toolbar is provided which is a configurable graphic control, herein called configurable toolbar. Within the configurable toolbar, a set of customizable buttons are present.

To the set of customizable buttons, it is provided the possibility to add at least one forward smart navigation button which, if clicked at run-time, is directing to an additional page screen. The calling page is herein referred as source page and the called additional page screen as a target page.

A graphic configuration tool is provided for enabling the configuration of the configurable toolbar in a graphic way by generating a configuration file containing the relevant information for the execution of the customizable buttons.

At engineering time, through the configuration tool, the source page is explored so that the configurable toolbar is presented with the set of customizable buttons.

At engineering time, it is added, to the set of customizable buttons, at least one forward smart navigation button to direct to a given selected target page.

At engineering time, to the added at least one smart navigation button it is associated the universal resource locator (URL) of the given target page according to a given customer requirement.

In the set of customizable buttons, it may be provided the possibility to add a backward smart navigation button which, if clicked at run-time, is directing from the target page back to the calling source page.

In order to enable information exchange at run-time between the source page and the target page, it may advantageously be provided, at development time, a navigation context for storing, at run-time, a set of parameters. The set of parameters may comprise a set of data parameters and/or a set of status parameters.

The navigation context is a service for managing the information exchange while switching between the source page and the target page. The navigation context is able, upon-events, to collect, store and provide the required navigation information while navigating back and forth from the source page to the target page.

As used herein, the terms "parameter data" denote the parameter information exchanged between the context and the source and/or target page. For example, the parameter data may include the information that the system engineer wishes to be available in the target page through the context, where the values of the parameter data may be selected at run-time by an end-user.

As used herein, the terms "status data" denote the information on the status of the original source page before the forward smart navigation button was clicked by the end-user at run-time. For example, information on the status may include selected row, filter applied, selected tab-panel and other.

The navigation service is an intelligent context in that it is able, once interrogated by notifications from the source or target page to act and provide the relevant navigation information data to the page requiring the data.

Thus in order to obtain a desired view of the target page according to given customer requirements, it may be selected, at engineering time, a subset of data parameters to be supplied to the target page through the navigation context at run-time.

At engineering time, the system engineer may preferably define a desired view in which the target page is loaded at run-time depending on the values of the selected subset of data parameters.

Advantageously, in this way, at run-time, the view of the target page may be filtered according to the value of the subset of parameters supplied by the navigation context. For example, at run-time, the end-user can select in the source page a given order and by clicking, on the next-page button, the target page is visualizing the materials required for the given selected orders.

Embodiments of the invention may conveniently allow the navigation back from the target page to the related calling source page. Hence at run time, the end-user may switch between a source page and a target page in both-directions by clicking either the forward navigation button or the backward navigation button.

At run time, when clicking the backward smart navigation button from the target page, the called source page may be loaded in a view depending on the values of a selected subset of the set of status parameters stored in the navigation context.

Hence, the configurable toolbar can be customized, at engineering time, by adding one or more smart-navigation buttons for linking screens according to a desired navigation schema.

Advantageously, the configurable toolbar may be a graphic tool available for the developer at page developing time who wishes to create general purpose screens and then part of the integrated developer environment as well as may be a graphic toll available to the system engineer who desire to add connection between screens in specific project, according to specific customer requirements, without accessing the source code, then part of a browser.

An example embodiment is described below. The FIGURE of the drawing is a snapshot example taken from the configurable toolbar of a page-screen GUI according to an example embodiment of the present invention.

Let us assume that the system engineer desires to link the page screen to another additional page screen without accessing the code of the library page. In order to do that, the system engineer, according to this example embodiment, is enabled by browsing the configurable toolbar of the given source screen to create a forward smart navigation button 1 and associate to it the URL 2 of the destination target page. In addition, upon requirement, inside the configurable toolbar it is given the possibility to supply a collection of data parameters 3 that will be available at the target page through the navigation context.

With the GUI configuration tool shown in the FIGURE, it is thus possible to add, at engineering, a next button link 1 so that when the button in the toolbar control is clicked by the end-user at run-time, the application flow is redirect to the target page and, if desired, a list of parameter values are received by the target page will receive upon querying the navigation context.

With the GUI configuration tool, two types of links may be provided.

At least one next link: when the forward smart navigation button in the toolbar control is clicked, the application flow is direct to the target screen, data parameters may be optionally be supplied to the target screen.

A back link: when the back smart navigation in the toolbar control is clicked on the target screen, the application flow is redirected to the source screen and each control in the screen reloads its previous status according to the value of the status parameters (e.g. selected row, filter applied, selected tab-panel etc.).

At run time, the end-user clicks the forward smart navigation button so that the target page whose URL was defined at engineering time is displayed. Optionally, upon customer requirements, at engineering time, the system engineer may have defined a desired view of displaying the target page, for example depending on the values of the data parameters received from the navigation context which were previously supplied by the target page, at run-time, upon clicking, by the end-user, on the forward smart navigation button.

In addition to the embodiments of the present invention described above, the person of average skill in the art will be able to arrive at a variety of other arrangements and steps which, if not explicitly described in this document, nevertheless fall within the scope of the appended claims.

LIST OF USED ACRONYMS

GUI Graphical User Interface
IT Information Technology
MES Manufacturing Executing Systems
URL universal resource locator

The invention claimed is:

1. A method for customizing a user-interface of a screen of a general purpose manufacturing execution system (MES) software application taking into account a specific customer requirement, the screen being a web-page more specifically a page-screen, the method comprises the steps of:
   a) providing, for at least one page-screen, a configurable toolbar being a configurable graphic control, wherein the configurable toolbar having a set of customizable buttons, the at least one page-screen being defined by a given source code;
   b) providing, within the set of customizable buttons, a possibility to add at least one forward smart navigation button which, if clicked at run-time, directing to an additional page screen, thus defining a calling page screen and a called additional page screen hereinafter referred to as a source page and a target page respectively;
   c) providing a graphic configuration tool for enabling a configuration of the configurable toolbar;
   d) exploring the source page so that the configurable toolbar is presented with the set of customizable buttons at engineering time, through the configuration tool;
   e) adding, to the set of customizable buttons, the at least one forward smart navigation button to direct to a given selected target page during the engineering time, through the graphic configuration tool without changing the given source code of the at least one page screen;
   f) associating to the at least one smart navigation button added, an URL address of the given selected target page according to a given customer requirement during the engineering time, through the graphic configuration tool; and
   g) upon actuation of the at least one forward smart navigation button, the configurable toolbar without changing the given source code of the at least one page screen, invoking a navigation context for exchanging a stored set of parameters between the source page and the target page, wherein the stored set of parameters, which is exchanged between the source page and the target page, includes a set of data parameters and a set of status parameters and determines a view of the target page, and wherein the set of status parameters includes information on a status of the source page.

2. The method according to claim 1, wherein in the set of customizable buttons, providing a backward smart navigation button which, if clicked at the run-time, is directing from the target page back to the source page.

3. The method according to claim 1, wherein during performance of the step f), selecting a subset of data parameters to be supplied to the target page, at the run-time, through the navigation context.

4. The method according to claim 3, which further comprises, at the engineering time, defining a desired view in which the target page is loaded at the run-time depending on values of the subset of data parameters.

5. The method according claim 3, wherein, at the run time, when clicking the backward smart navigation button from the target page, the source page called is loaded in a view depending on values of the set of status parameters stored in the navigation context when the forward button was clicked in the source page at run-time.

6. A method, which comprises the step of:
   switching, at run time, between a source page and a target page of a user-interface of a screen of a general purpose manufacturing execution system software application customized according to the method of claim 1.

7. A non-transitory computer-readable medium having computer-executable instructions for performing a method for customizing a user-interface of a screen of a general purpose manufacturing execution system (MES) software application taking into account a specific customer requirement, the screen being a web-page more specifically a page-screen, the method comprises the steps of:
   providing, for at least one page-screen, a configurable toolbar being a configurable graphic control, wherein the configurable toolbar having a set of customizable buttons, the at least one page-screen being defined by a given source code;
   providing, within the set of customizable buttons, a possibility to add at least one forward smart navigation button which, if clicked at run-time, directing to an additional page screen, thus defining a calling page screen and a called additional page screen hereinafter referred to as a source page and a target page respectively;

providing a graphic configuration tool for enabling a configuration of the configurable toolbar;

exploring the source page so that the configurable toolbar is presented with the set of customizable buttons at engineering time, through the configuration tool;

adding, to the set of customizable buttons, the at least one forward smart navigation button to direct to a given selected target page during the engineering time, through the graphic configuration tool without changing the given source code of the at least one page screen;

associating to the at least one smart navigation button added, an URL address of the given selected target page according to a given customer requirement during the engineering time, through the graphic configuration tool; and upon actuation of the at least one forward smart navigation button, the configurable toolbar without changing the given source code of the at least one page screen, invoking a navigation context for exchanging a stored set of parameters between the source page and the target page, wherein the stored set of parameters, which is exchanged between the source page and the target page, includes a set of data parameters and a set of status parameters and determines a view of the target page, and wherein the set of status parameters includes information on a status of the source page.

8. A system, comprising:

a computer programmed for performing a method for customizing a user-interface of a screen of a general purpose manufacturing execution system (MES) software application taking into account a specific customer requirement, the screen being a web-page more specifically a page-screen, said computer programmed to:

provide, for at least one page-screen, a configurable toolbar being a configurable graphic control, wherein the configurable toolbar having a set of customizable buttons, the at least one page-screen being defined by a given source code;

provide, within the set of customizable buttons, a possibility to add at least one forward smart navigation button which, if clicked at run-time, directing to an additional page screen, thus defining a calling page screen and a called additional page screen hereinafter referred to as a source page and a target page respectively;

provide a graphic configuration tool for enabling a configuration of the configurable toolbar;

explore the source page so that the configurable toolbar is presented with the set of customizable buttons at engineering time, through the configuration tool;

add, to the set of customizable buttons, the at least one forward smart navigation button to direct to a given selected target page during the engineering time, through the graphic configuration tool without changing the given source code of the at least one page screen;

associate to the at least one smart navigation button added, an URL address of the given selected target page according to a given customer requirement during the engineering time, through the graphic configuration tool; and upon actuation of the at least one forward smart navigation button, the configurable toolbar without changing the given source code of the at least one page screen, invoking a navigation context for exchanging a stored set of parameters between the source page and the target page, wherein the stored set of parameters, which is exchanged between the source page and the target page, includes a set of data parameters and a set of status parameters and determines a view of the target page, and wherein the set of status parameters includes information on a status of the source page.

\* \* \* \* \*